(12) United States Patent
Brody et al.

(10) Patent No.: US 12,265,985 B2
(45) Date of Patent: Apr. 1, 2025

(54) SYSTEM, METHOD, AND APPARATUS FOR COLLECTING CONFECTIONERY PRODUCTS

(71) Applicant: MARS, INCORPORATED, McLean, VA (US)

(72) Inventors: Chris Brody, Montclair, NJ (US); Caroline Caparyan, Long Valley, NJ (US); Teresa Fernandes, Lafayette, NJ (US); Sandeep Dadlani, McLean, VA (US); Shubham Mehrish, Bridgewater, NJ (US); Romain Apert, Windsor (GB); Balakrishnan Subramanian, St. Albans (GB); Jess Smith, Cottleville, MO (US); Rick Keller, Long Valley, NJ (US); Sid Chaudhary, Langley (GB); Leonard J. Bogner, Jr., Malverne, NJ (US); Balu Arumugam, Flanders, NJ (US); Jason Burich, Greenbay, WI (US); Seth T. Dobbs, Evanston, IL (US); Megan N. Donahue, Glencoe, IL (US); Praveen Moturu, McLean, VA (US)

(73) Assignee: Mars, Incorporated, McLean, VA (US)

( * ) Notice: Subject to any disclaimer, the term of this patent is extended or adjusted under 35 U.S.C. 154(b) by 0 days.

(21) Appl. No.: 18/031,813

(22) PCT Filed: Oct. 15, 2021

(86) PCT No.: PCT/US2021/055184
§ 371 (c)(1),
(2) Date: Apr. 13, 2023

(87) PCT Pub. No.: WO2022/081974
PCT Pub. Date: Apr. 21, 2022

(65) Prior Publication Data
US 2023/0394519 A1    Dec. 7, 2023

Related U.S. Application Data

(60) Provisional application No. 63/092,825, filed on Oct. 16, 2020.

(51) Int. Cl.
*G06Q 30/0226*    (2023.01)
*G06Q 30/0235*    (2023.01)

(52) U.S. Cl.
CPC ..... *G06Q 30/0233* (2013.01); *G06Q 30/0235* (2013.01)

(58) Field of Classification Search
CPC combination set(s) only.
See application file for complete search history.

(56) References Cited

U.S. PATENT DOCUMENTS

| 2006/0253340 A1 | 11/2006 | Levchin et al. |
| 2008/0040270 A1 | 2/2008 | Buchheit et al. |

(Continued)

FOREIGN PATENT DOCUMENTS

| CA | 2752625 A1 * | 3/2013 | ........... G06Q 10/107 |
| GB | 2508832 A * | 6/2014 | ....... G06F 17/30876 |
| WO | WO-2009052605 A1 * | 4/2009 | ............. G06Q 30/02 |

*Primary Examiner* — Marie P Brady
(74) *Attorney, Agent, or Firm* — Bookoff McAndrews, PLLC

(57) ABSTRACT

A system, method, and media permit a computing system to access information associated with one or more distribution points comprising a distribution network. The computing system can receive a request from a first user to access a first distribution point of the one or more distribution points and determine that the first user has permission to access the first distribution point. The computing system can determine an account of a second user associated with the first distribution (Continued)

point and transmit, from the account of the second user to an account associated with the first user, one or more credits. The computing system can update one or more properties of the distribution network based on the transmittal.

27 Claims, 10 Drawing Sheets

(56) References Cited

U.S. PATENT DOCUMENTS

| | | |
|---|---|---|
| 2013/0129121 A1 | 5/2013 | Yamashita |
| 2013/0282454 A1* | 10/2013 | Alpert ................. G06Q 30/0209 |
| | | 705/14.12 |
| 2014/0108556 A1* | 4/2014 | Abhyanker ............ G06Q 10/10 |
| | | 709/204 |
| 2014/0180790 A1 | 6/2014 | Boal |
| 2014/0278886 A1* | 9/2014 | Roka .................. G06Q 30/0226 |
| | | 705/14.27 |
| 2016/0318716 A1 | 11/2016 | Elejalde et al. |
| 2017/0031996 A1* | 2/2017 | Priness .................. G06Q 30/06 |
| 2017/0061527 A1* | 3/2017 | Vakilian .................... G06T 7/70 |
| 2019/0311341 A1* | 10/2019 | Rice ........................ G06F 3/011 |

* cited by examiner

SYSTEM, METHOD, AND APPARATUS FOR COLLECTING CONFECTIONERY PRODUCTS

TECHNICAL FIELD

This disclosure generally relates to utilizing client devices for distributing and collecting confectionery products.

BACKGROUND

Mobile applications, which are commonly downloaded and accessed by users of smartphone computing devices, have become a ubiquitous and necessary component for engaging consumers and improving the user experience in nearly every industry. With the prevalence of smartphones in consumer culture, businesses are afforded new opportunities to connect with customers through a single mobile application. Augmented reality experiences, especially through mobile applications, can help to enhance the user experience and engage new customers. Accordingly, there is an ongoing need in the confectionery industry to engage customers using mobile applications.

DESCRIPTION OF EXAMPLE EMBODIMENTS

Figure 1:
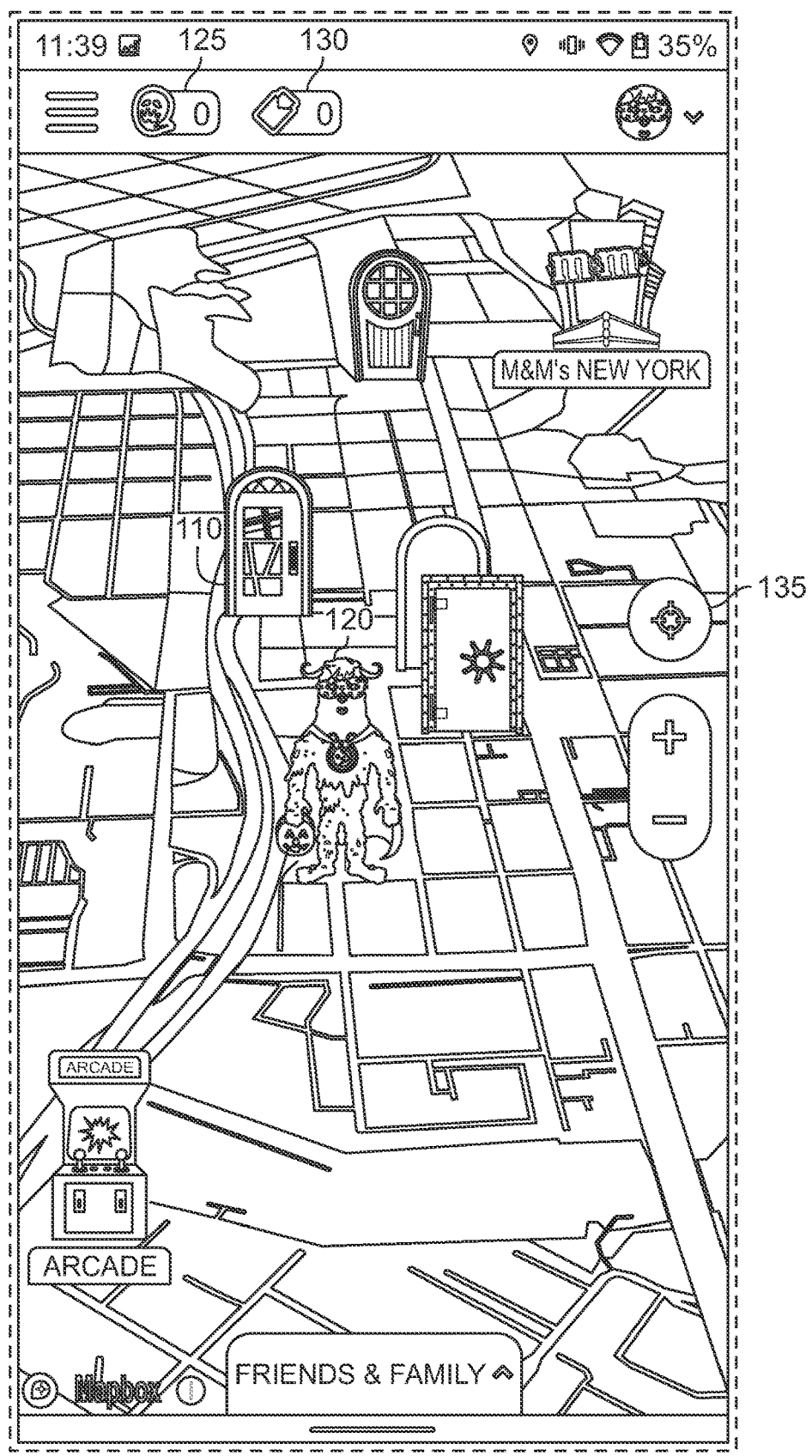
FIG. 1 illustrates an example GUI, according to certain non-limiting embodiments, on a client device utilized for facilitating access to a confectionery distribution network.

The terms used in this specification generally have their ordinary meanings in the art, within the context of this disclosure and in the specific context where each term is used. Certain terms are discussed below, or elsewhere in the specification, to provide additional guidance in describing the compositions and methods of the disclosure and how to make and use them.

As used in the specification and the appended claims, the singular forms "a," "an" and "the" include plural referents unless the context clearly dictates otherwise.

As used herein, the terms "comprises," "comprising," or any other variation thereof, are intended to cover a non-exclusive inclusion, such that a process, method, article, system, or apparatus that comprises a list of elements does not include only those elements but can include other elements not expressly listed or inherent to such process, method, article, or apparatus.

In the detailed description herein, references to "embodiment," "an embodiment," "one embodiment," "in various embodiments," "certain embodiments," "some embodiments," "other embodiments," "certain other embodiments," etc., indicate that the embodiment(s) described can include a particular feature, structure, or characteristic, but every embodiment might not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, the term "confectionery product" refers to a sweet or dessert edible composition. Confectionery products can include, but are not limited to, cakes, cookies, pies, candies (hard and soft), compressed mints, chewing gums, gelatins, ice creams, sorbets, jams, jellies, chocolates, fudge, fondant, liquorice, taffy, and combinations thereof.

As used herein, the term "client device" refers to a computing system or mobile device used by a user of a given mobile application. In particular, the computing system can comprise functionality for determining its location, direction, or orientation, such as a GPS receiver, compass, gyroscope, or accelerometer. Client device can also include functionality for wireless communication, such as BLUETOOTH communication, near-field communication (NFC), or infrared (IR) communication or communication with wireless local area networks (WLANs) or cellular-telephone network. Such a device can also include one or more cameras, scanners, touchscreens, microphones, or speakers. Client devices can also execute software applications, such as games, web browsers, or social-networking applications. Client devices, for example, can include user equipment, smartphones, tablet computers, laptop computers, desktop computers, or smartwatches.

As used herein, the term "redemption entity" refers to, for example, an affiliated retailer, business, corporation, in-store retailer, distributor, re-saler, or non-profit organization that is capable of receiving a request to complete a credit redemption from the confectionery distribution network. In particular, the redemption entity can comprise one or more infrastructures facilitating redemption, for example an online store, a retail store, one or more online websites, or a combination thereof. The redemption entity can be a first-party, second-party, or third-party entity.

Many holiday traditions facilitate the distribution of confectionery products, often to young children. For example, on Halloween children often dress in costume "trick-or-treating" by visiting the houses in their neighborhood, knocking on doors, and either receiving a "treat" (e.g., a confectionery product, such as candy or chocolate) from the homeowner, or performing a "trick" (i.e., a harmless joke or prank) if no "treat" is available. As another example, Christian Easter traditions typically include children searching their house or neighborhood for hidden "Easter Eggs", which often contain confectionery products. Confectionery products are distributed at many other national, international, religious, or secular holidays or events.

Yet, these holiday traditions can be enhanced to further improve the user experience. For example, parents must dedicate several hours to supervising their children during these activities or permit their children to participate unsupervised, which can require for example, crossing busy streets at night. Further, participating children often come into close contact with numerous other children, neighbors, and strangers, which increases the risk of spreading communicable diseases or infections during these activities. As another example, these activities can take place during inclement weather, such as cold temperatures, rain, or snow. These holiday traditions thus provide an opportunity to improve the user experience by providing a mobile application that creates a fun environment that allows children, parents, and members of the community to enjoy these traditions digitally. Embodiments disclosed herein provide alternatives that allow participation in these activities without the aforementioned inconveniences and risks. Certain non-limiting embodiments provide for a virtual confectionery distribution network, comprising virtual users and virtual doorways, that is accessible by both children, parents, homeowners, or other members of the community or neighborhood to facilitate participation in these festive traditions. In some non-limiting embodiments, users can register a client device with a mobile application that provides a confectionery distribution network. Other non-limiting embodiments permit users to establish one or more connections with other users through the network. After the connection is established, users can exchange confectionery products through the confectionery distribution system. In addition, users can further register virtual doorways corresponding to a user, or a sub-user account that permits them to interact with other users that are registered on the distribution network. Certain non-limiting embodiments further provide methods for users to collect or distribute confectionery credits, which can be redeemed for non-virtual confectionery products.

Example processes and embodiments can be conducted by a computing system or client device through a mobile application and an associated graphical user interface ("UX" or "GUI"). In certain non-limiting embodiments, the computing system or client device can be, for example, a mobile computing system—such as a smartphone, tablet computer, or laptop computer. This mobile computing system can include functionality for determining its location, direction, or orientation, such as a GPS receiver, compass, gyroscope, or accelerometer. Such a device can also include functionality for wireless communication, such as BLUETOOTH communication, near-field communication (NFC), or infrared (IR) communication or communication with wireless local area networks (WLANs), 3G, 4G, LTE, LTE-A, 5G, Internet of Things, or cellular-telephone network. Such a device can also include one or more cameras, scanners, touchscreens, microphones, or speakers. Mobile computing systems can also execute software applications, such as games, web browsers, or social-networking applications. With social-networking applications, users can connect, communicate, and share information with other users in their social networks.

FIG. 1 illustrates an example GUI, according to certain non-limiting embodiments, on a client device utilized for facilitating access to a confectionery distribution network. In certain non-limiting embodiments, the GUI can comprise one or more icons representing virtual doorways 110 located on a map. One or more virtual doorways can be located on the map based on an address corresponding to a particular virtual doorway, for example and not by way of limitation a physical address of the user account that registered the virtual doorway. The GUI can also include user avatar 120, representing the location of a computing device affiliated with the user account accessing the GUI. In some non-limiting embodiments the default view of the GUI can correspond to a current location of the client device accessing the confectionery distribution network (e.g., the map can by default be centered on the current location of the client device that has accessed the GUI). In addition, the GUI can further include counters 125 and 130, which indicate how many points and confectionery credits, respectively, the user account that is logged in to the mobile application currently possesses. GUI can further include one or more buttons 135 that permit the user of the client device to adjust the appearance and perspective of the GUI. Although FIG. 1 depicts one or more buttons 135 for adjusting the perspective of the display of the GUI, other non-limiting embodiments can include additional buttons or touch gestures consistent with a traditional map GUI, for example and not by way of limitation, a compass indicator that permits the user of the GUI to reorient the displayed map, or a pinch-to-zoom gesture to adjust the scale of the displayed map.

In certain non-limiting embodiments, a computing system can generate and update the GUI as depicted in FIG. 1. When a user opens the GUI the computing system can obtain the current location of the client device that is accessing the GUI. The location can be automatically obtained or manually entered by the user. The client device can then utilize this location to generate a map interface that corresponds to the current location of the client device. The computing system can further access a database that comprises, for example and not by way of limitation, a list of virtual doorways and corresponding physical addresses, and determine one or more virtual doorways that can be visible on the GUI. In certain non-limiting embodiments, the computing system can request information from a database at a regular time interval (e.g., every 10 minutes). Each virtual door can represent one or more users of the confectionery distribution network. For example, the computing system can generate one or more icons representing virtual doorways 110 based on the determination that one or more virtual doorways are visible. The visibility of the one or more virtual doorways can be based on the client location and/or privacy settings of the users in the confectionery distribution network. In some non-limiting embodiments, in the event that multiple virtual doorways are located at the same physical address (e.g., a multi-unit apartment building), the computing system can generate a single virtual doorway icon 110 that further indicates the number of virtual doorways located at the particular location on the map within the GUI. In some non-limiting embodiments, users can be logged into multiple client devices simultaneously and any changes in behaviors or account activities are recorded on a server associated with the confectionery distribution network and refreshed accordingly on the GUI of all client devices.

In certain non-limiting embodiments, a user can register a user account before entering the confectionery distribution network. In certain non-limiting embodiments, a user can create and register a user account via a mobile application or an internet browser on the computing system. During the registration process, the user can submit personal information such that their user account can be linked to the particular user. This personal information can include, for example and not by way of limitation, the user's name, username, password, email address, physical address, date of birth, telephone number, and payment card information (e.g., number, expiration date, etc.). In some non-limiting embodiments registration can further include an authentication or security process to verify the identity of the user (e.g., two-step verification via an email or text message). Upon completion of registration, the computing system can securely transmit the user's entered information to a server or website associated with a database. Further, in some non-limiting embodiments the confectionery distribution network can comply with local, state, national, or international standards and laws related to the protection of personal identifiable information.

In certain other non-limiting embodiments, a user can enter the confectionery distribution network as a guest user without previously registering a user account. As an example, some non-limiting embodiments permit a registered user to send an invitation through the computing system to a guest user by providing, for example and not by way of limitation, the guest user's name, email address, or telephone number. The invitation can further include an initial amount of guest confectionery credit to enable the guest user to participate in the confectionery distribution network. In some non-limiting embodiments, the guest confectionery credit can be transmitted from the user account associated with the user that sent the invitation. In other non-limiting embodiments, the guest confectionery credit can be provided by the computing system as an incentive to join the confectionery distribution network. Upon receiving the invitation, the guest user can participate in the confectionery distribution network without registering or with minimal registration (e.g., the user's name and email address). If a guest user chooses not to register, the guest user account can be associated with the user account of the user that sent the invitation. In some non-limiting embodiments, the features and controls of a guest user account can be more limited than a registered user account. For example, the computing system can generate a generic proxy avatar for a guest user.

Figure 2:
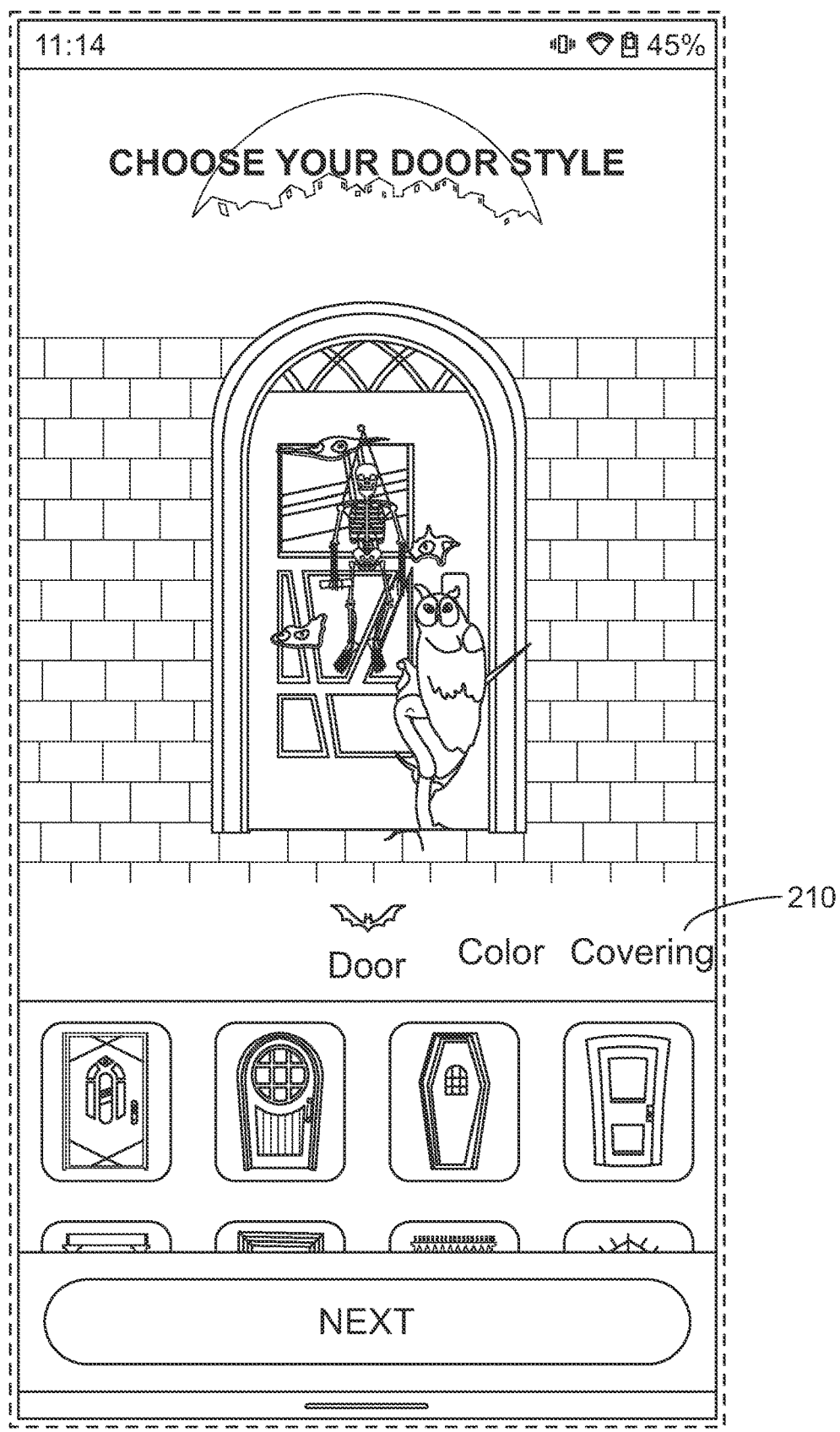
FIG. 2 illustrates an example GUI, according to certain non-limiting embodiments, on a client device for creating and customizing a virtual doorway.

Upon completion of registration of a user account, a user can be prompted to create and link a distribution point, for example a virtual doorway, to their user account for use on the confectionery distribution network. FIG. 2 illustrates an example GUI, according to certain non-limiting embodiments, on a client device for creating and customizing a virtual doorway. In certain non-limiting embodiments, creating the virtual doorway can include one or more options 210 for customization of its appearance, for example and not by way of limitation, the style, color, coverings, accents, sounds, and messages that appear when another user interacts with a particular virtual doorway. In certain non-limiting embodiments, the customized appearance of a particular virtual doorway can also appear when displayed as an icon 110 on the GUI as depicted in FIG. 1. The settings comprising the customized appearance of the virtual doorway can be saved on a remote server, cloud server, or in the memory of the client device. The computing system can access one or more of these settings when performing one or more actions, for example generating an icon for display on the GUI representing a particular virtual doorway. The customized appearance can be associated with the user account, such that the GUI illustrates the customized appearance when user account information is entered.

Certain non-limiting embodiments further permit entities (e.g., businesses, local governments, schools, etc.) to register virtual doorways and participate on the confectionery distribution network. A virtual doorway of an entity can include any of the features or settings of an individual user's virtual doorway as disclosed herein. In addition, an entity can further distribute exclusive content to users through their virtual doorway, for example and not by way of limitation, exclusive virtual costumes for user avatars, exclusive virtual decorations for virtual doorways, gift cards, physical merchandise, or coupons redeemable for the aforementioned content.

Figure 3:
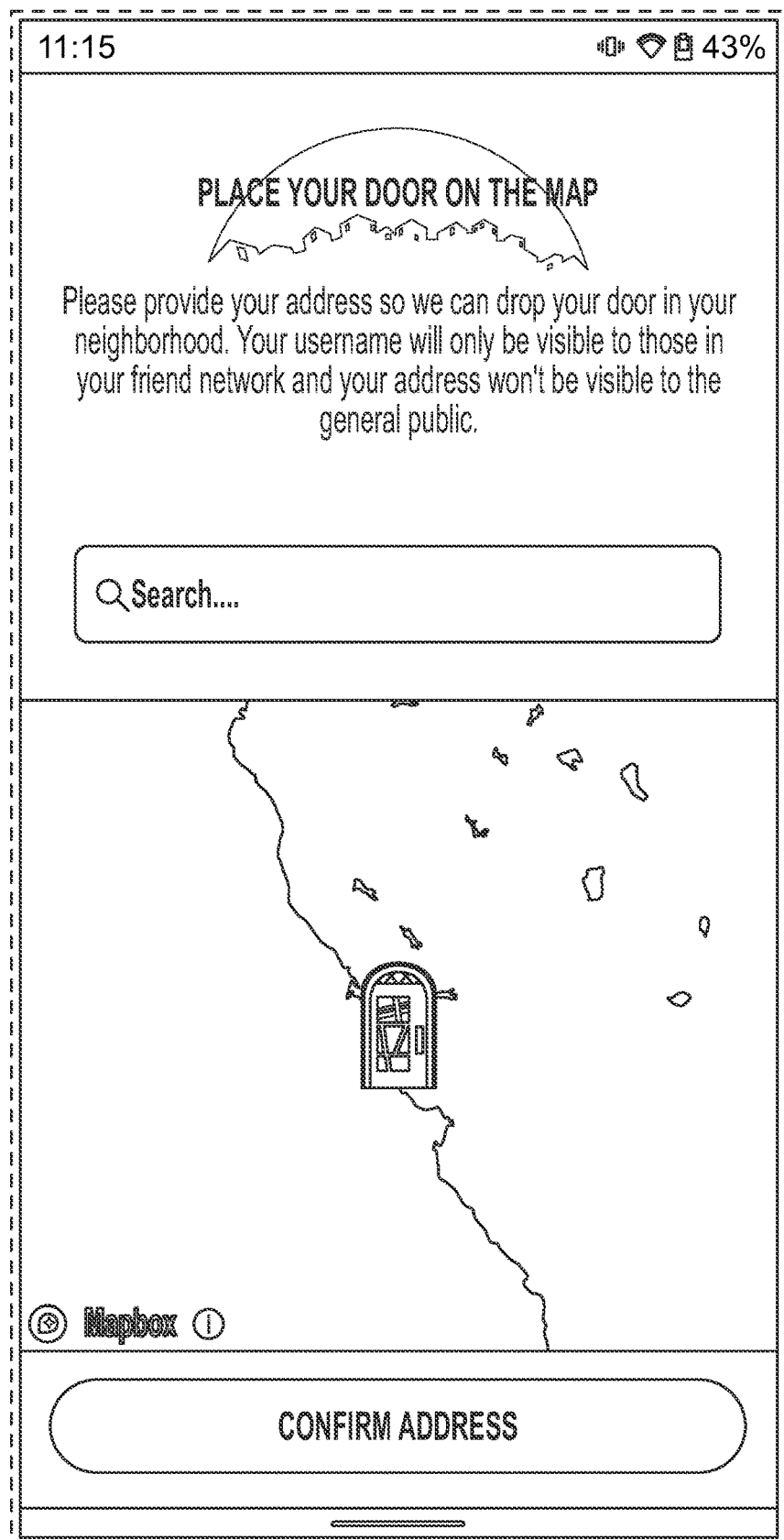
FIG. 3 illustrates an example GUI, according to certain non-limiting embodiments, on a client device for providing a physical address that corresponds to a virtual doorway.

In certain non-limiting embodiments, the user can further be prompted to provide a physical address (e.g., "123 Main Street, San Francisco CA 94128") that corresponds to a particular doorway. FIG. 3 illustrates an example GUI, according to certain non-limiting embodiments, on a client device for providing a physical address that corresponds to a virtual doorway. In some non-limiting embodiments this address can be entered manually by the user who created the virtual doorway, and can be located at any physical address entered by the user, such as the user's current location, current residence, or an address in the user's hometown, college town, or any other location chosen by the user. In other non-limiting embodiments the address can be determined automatically, either based on information associated with the user's account, or using location sensor data from the client device, such as location data obtained from a mobile phone's GPS receiver or by proximity to a given base station or access point. In certain other non-limiting embodiments, the physical address corresponding to the virtual doorway can be transmitted and uploaded to a database, where it can be utilized to geo-locate one or more virtual doorways and update the appearance of the GUI as described herein. In some non-limiting embodiments, the physical address and personal details of the user account linked to a particular virtual doorway can be hidden from view to one or more other users on the confectionery distribution network, in order to protect the privacy of this data. Further, in some non-limiting embodiments the confectionery distribution network can comply with local, state, national, or international standards and laws related to the protection of personal identifiable information.

After creating and providing a physical address for the virtual doorway linked to their user account, the user can be prompted to acquire confectionery credits that can subsequently distribute to other users via interactions with their virtual doorway. In certain non-limiting embodiments, the user can complete a virtual transaction on the confectionery distribution network through for example, a credit card purchase that allows the user to acquire a predetermined quantity of confectionery credits for their user account. In other non-limiting embodiments, the user can receive discounts for acquiring confectionery credits in greater quantity (e.g., 100 confectionery credits can be purchased for $10 USD, 1,000 confectionery credits can be purchased for $90 USD). In some non-limiting embodiments, a user can send a gift of confectionery credits to another user on the confectionery distribution network. As an example, a user can choose to send a monetary amount (e.g., $10 USD) of confectionery credits to another user. Upon receiving a request to send a gift, the computing system can query a database containing information about the confectionery credit amount in the sending user's account, and transfer the confectionery credit to the receiving user's account by updating the quantity of confectionery credits in both user's accounts. In some non-limiting embodiments, if the computing system determines the sending user does not contain sufficient confectionery credit in their account to complete the request to send a gift, the computing system can automatically initiate a virtual purchasing of confectionery credit according to the methods described herein.

Upon acquiring confectionery credits, the user can immediately make it available for distribution to other users via interactions with their virtual doorway. The user can subsequently acquire additional confectionery credits via additional virtual transactions at any time. In other non-limiting embodiments, the user can choose to automatically acquire additional confectionery credits at a predetermined frequency (e.g., daily or weekly), or when the amount of confectionery credit in the user's account drops below a predetermined threshold.

Figure 4:
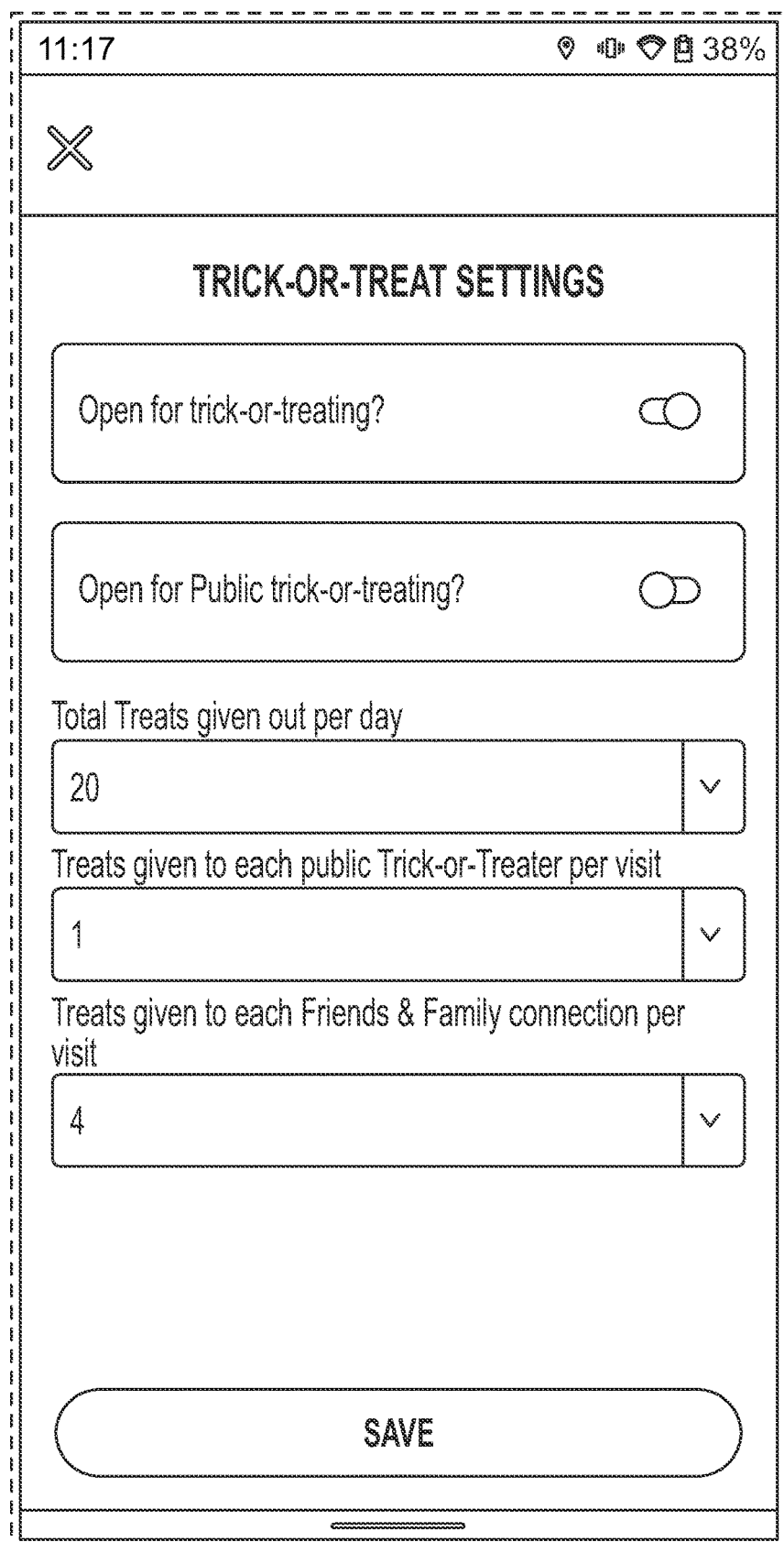
FIG. 4 illustrates an example GUI, according to certain non-limiting embodiments, on a client device for modifying one or more accessibility settings or distribution settings associated with a virtual doorway.

In certain non-limiting embodiments, each virtual doorway can be assigned one or more accessibility settings and distribution settings. FIG. 4 illustrates an example GUI, according to certain non-limiting embodiments, on a client device for modifying one or more accessibility settings and distribution settings associated with a virtual doorway. In some non-limiting embodiments one or more accessibility settings can determine whether a particular doorway is visible to one or more users on the GUI. In other non-limiting embodiments one or more accessibility settings can determine whether one or more users are able to receive confectionery credit via an interaction with a particular virtual doorway on the confectionery distribution network. The one or more accessibility settings can be adjusted by a user account that is linked to a particular virtual doorway, or automatically by the computing system. In some other non-limiting embodiments, any setting on the client device can be adjusted by the user, for example and not by way of limitation, notifications, sounds, client device connectivity settings, or location settings.

In certain non-limiting embodiments, a virtual doorway accessibility setting can comprise an option to make a virtual doorway available for confectionery credit distribution. When a virtual doorway is designated as "open", users can request to interact with the particular virtual doorway and receive confectionery credit. When a virtual doorway is designated as "closed", users can not request to interact with the particular virtual doorway. In certain other non-limiting embodiments, when a particular virtual doorway is designated as "closed" it can not appear to any user on the GUI. By default, a virtual doorway can be designated as "closed."

In certain non-limiting embodiments, a virtual doorway accessibility setting can comprise an option to make a virtual doorway "public" or "private". By default, a virtual doorway can be designated as "private." When a virtual doorway is designated as "public", the virtual doorway is visible on the GUI and available to distribute confectionery credit to any user on the confectionery distribution network. When a virtual doorway is designated as "private", the virtual doorway is only visible on the GUI and available to distribute confectionery credit to users that are on a "family and friends connection" list of the user account that is linked to particular virtual doorway. In some non-limiting embodiments the "family and friends connection" list associated with a user account can be manually populated by entering contact details identifying one or more other users on the confectionery distribution network, for example and not by way of limitation, their actual name, username, email address, or telephone number. In some non-limiting embodiments the "family and friends connection" list can be populated automatically, for example and not by way of limitation, by accessing a user's contacts stored on the client device, by accessing a user's friends or contacts on a user's account on a social network, by determining one or more users that are within a physical vicinity of the user (using e.g., the current physical location or network connection of the computing device), or by sharing a unique identifier, for example a QR code or access code, with one or more other users on the confectionery distribution network. The "family and friends connection" lists associated with a user account can be stored in a database on the local memory of the client device or on a remote or cloud server. Each user can have one or more "family and friends connection" lists, with the user being able to customize or modify the name of each list.

In some non-limiting embodiments, the user can be required to request and receive permission in order to add other users to their "family and friends connection" list. As an example, the user can request to add one or more second users to their "family and friends connection" list by, for example, including their username or email address as part of a request. Upon receiving this request, the computing system can process the request by sending a notification to the second user, through for example an e-mail or push notification on the client device. Upon receiving this notification, the second user can be required to accept the request. Upon accepting the request, the computing system can update the "family and friends connection" list of the first user to reflect the addition of the second user.

In certain non-limiting embodiments, a virtual doorway accessibility setting can be based on a particular time, day, or date setting. For example, an accessibility setting can dictate that one or more virtual doorways can be no longer accessible after a particular absolute date (e.g., Nov. 1, 2020 at 12:00:00 AM ET). As another example, an accessibility setting can dictate that one or more virtual doorways can only be accessible on particular days (e.g., weekends) or at particular times (e.g., daily from 5:00:00 PM to 9:00:00 PM ET). An accessibility setting can be further based on a frequency with which a particular user receives confectionery credit from a particular doorway on the confectionery distribution network (e.g., a particular virtual doorway cannot be visible or accessible to a particular user for 12 hours after the particular user has received confectionery credit from an interaction with a particular virtual doorway).

In certain non-limiting embodiments, a virtual doorway accessibility setting can be based on the physical address associated with the virtual doorway. For example, an accessibility setting can limit virtual doorway access only to user accounts accessing the confectionery distribution network on client devices with a current location within a predetermined distance or vicinity (e.g., 500 feet, 1 mile radius, etc.) from the physical address associated with the virtual doorway. Both the public setting and private setting can be associated with the predetermined distance or vicinity.

In certain non-limiting embodiments, each virtual doorway can be assigned one or more confectionery credit distribution settings ("distribution settings"). For example, the one or more distribution settings can determine whether a particular doorway is visible to one or more users on the GUI. In certain other non-limiting embodiments one or more distribution settings can determine whether one or more users are able to receive confectionery credit via an interaction with a particular virtual doorway on the confectionery distribution network. In certain other non-limiting embodiments one or more distribution settings can be adjusted by a user account that is linked to particular virtual doorway, or these one or more distribution settings can be adjusted automatically by the computing system.

In certain non-limiting embodiments, a confectionery distribution setting can comprise a limitation on the overall amount of confectionery credit a particular virtual doorway can distribute over a particular period of time (e.g., 500 total confectionery credits every 24 hours). As another example, a distribution setting can comprise restricting the distribution of confectionery credit after the confectionery credits in the user account linked to a particular virtual doorway drops below a predetermined level (e.g., the virtual doorway will not be available for confectionery credit distribution after the account linked to the virtual doorway drops below 50 confectionery credits). As another example, a distribution setting can comprise setting a quantity of confectionery credit distributed to a particular user based on whether they are on a "family and friends connection" list of the user account that is linked to a particular virtual doorway (e.g., a user on the "family and friends connection" list can receive 4 confectionery credits per interaction with a virtual doorway, whereas a public user can only receive 1 confectionery credit per interaction with a virtual doorway). In other words, the quantity of confectionery credit can be dynamically adjusted based on whether a particular user is public or included within a "family and friends connection" list.

Figure 5:
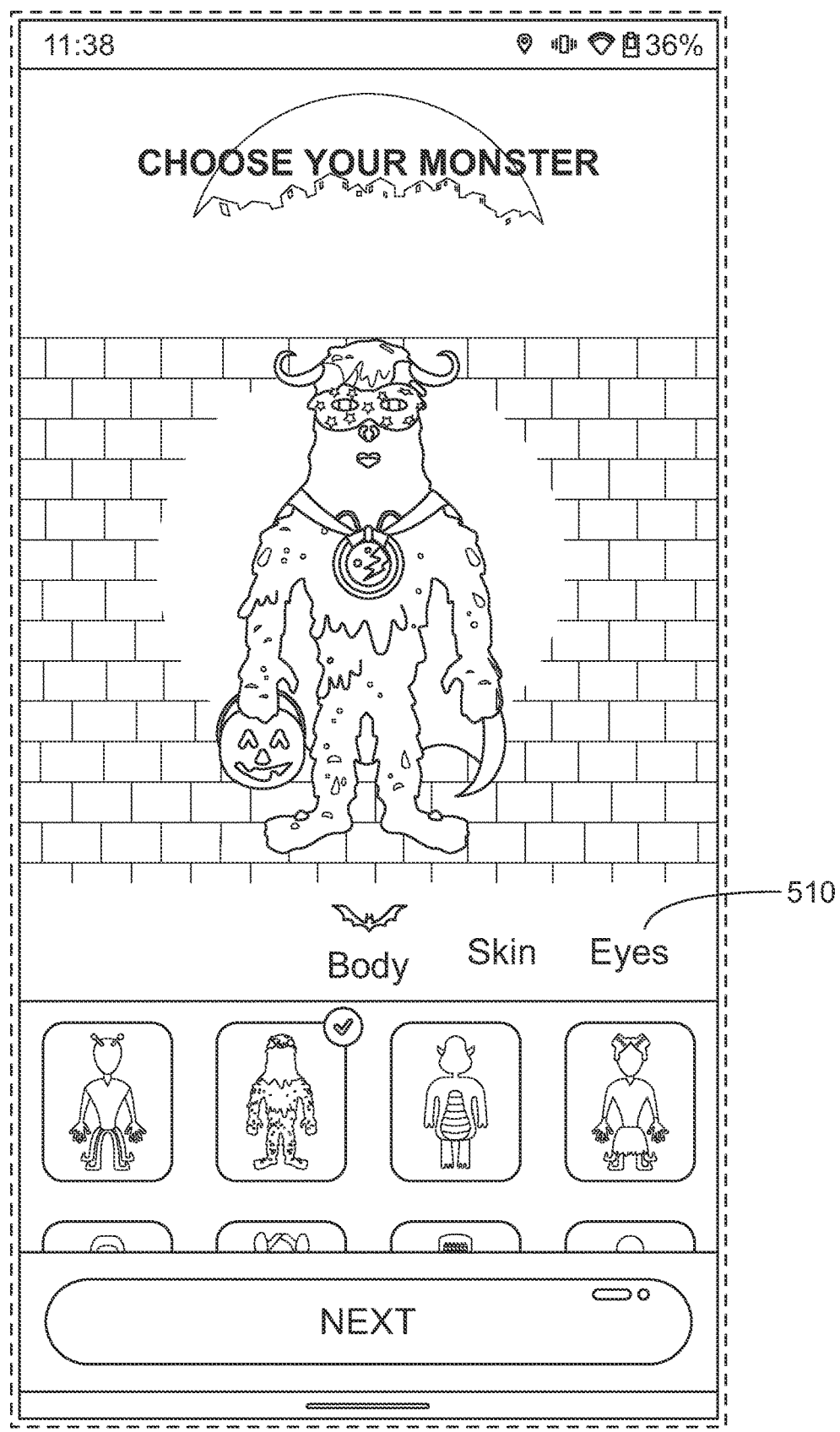
FIG. 5 illustrates an example GUI, according to certain non-limiting embodiments, on a client device for creating and customizing a user avatar.

In addition to distributing confectionery credit through their virtual doorway, certain non-limiting embodiments provide methods for users to request interactions with other user's virtual doorways to acquire and receive confectionery credit. Other non-limiting embodiments further permit each user account to create and customize a unique avatar for their user account that can be displayed on the GUI, for example and not by way of limitation, when a user interacts with a virtual doorway. FIG. 5 illustrates an example GUI, according to certain non-limiting embodiments, on a client device for creating and customizing a user avatar. In some non-limiting embodiments, creating the user avatar can include options 510 for customization of its appearance, for example and not by way of limitation, a festive costume (e.g., a ghost during Halloween, or a bunny during Easter), skin, eyes, or other appearance characteristics associated with the avatar of the user. User avatars can be created by the collectors and distributors of the confectionery credits.

In certain non-limiting embodiments, a user can create one or more sub-user accounts, which are linked to their user accounts, and can be used to interact with other users' virtual doorways to acquire and receive confectionery credit. Each sub-user account can have unique settings, characteristics, and quantities of confectionery credit based on each sub-user's activity on the confectionery distribution network. For example, a parent can create sub-user accounts for each of his or her children. Each of his children's sub-user accounts can have different quantities of confectionery credit based on the number of virtual doorways with which each of the children have interacted. When creating and registering a sub-user account, the user can submit unique account information for each sub-account, for example, a name, username, and password associated with each sub-user account. Additionally, in some non-limiting embodiments each sub-user account can be customized with a unique avatar comprising for example and not by way of limitation, a costume, height, weight, sounds, or other appearance characteristics associated with the avatar of the sub-user. In certain non-limiting embodiments each sub-user account can be linked to a particular user account, and the user account can utilize one or more settings to restrict or limit a sub-user account's activity, for example and not by way of limitation, restricting one or more sub-users from purchasing or redeeming confectionery credits. In some non-limiting embodiments, sub-user accounts can be restricted from accessing usernames or other personal identifiable information from one or more other user accounts or sub-user accounts.

Some non-limiting embodiments provide methods for user accounts and sub-user accounts to acquire confectionery credits by participating in the confectionery distribution network. A user or sub-user account can participate by accessing the confectionery distribution network via a client device. A user or sub-user can interact with the mobile application via a GUI as depicted in FIG. 1, which can include a map and one or more icons of virtual doorways 110. Although the map can correspond to the current location of the client device the user account or sub-user account is using to access the confectionery distribution network, some non-limiting embodiments permit a user or sub-user to access virtual doorways at any location by, for example and not by way of limitation, zooming, panning, or scrolling the map using one or more buttons 135 as depicted in FIG. 1. In certain non-limiting embodiments, icons of virtual doorways 110 can only be visible to a particular user or sub-user account according to one or more accessibility and distribution settings as described herein. In some non-limiting embodiments, a user or sub-user account can access the GUI to select a particular virtual doorway icon 110 from the map interface to initiate a request to interact with a particular virtual doorway and collect confectionery credit. If multiple user accounts or sub-user accounts request to interact with a particular virtual doorway, the computing system can place the users or sub-user accounts into a virtual queue based on the time their request is initiated.

Figure 6:
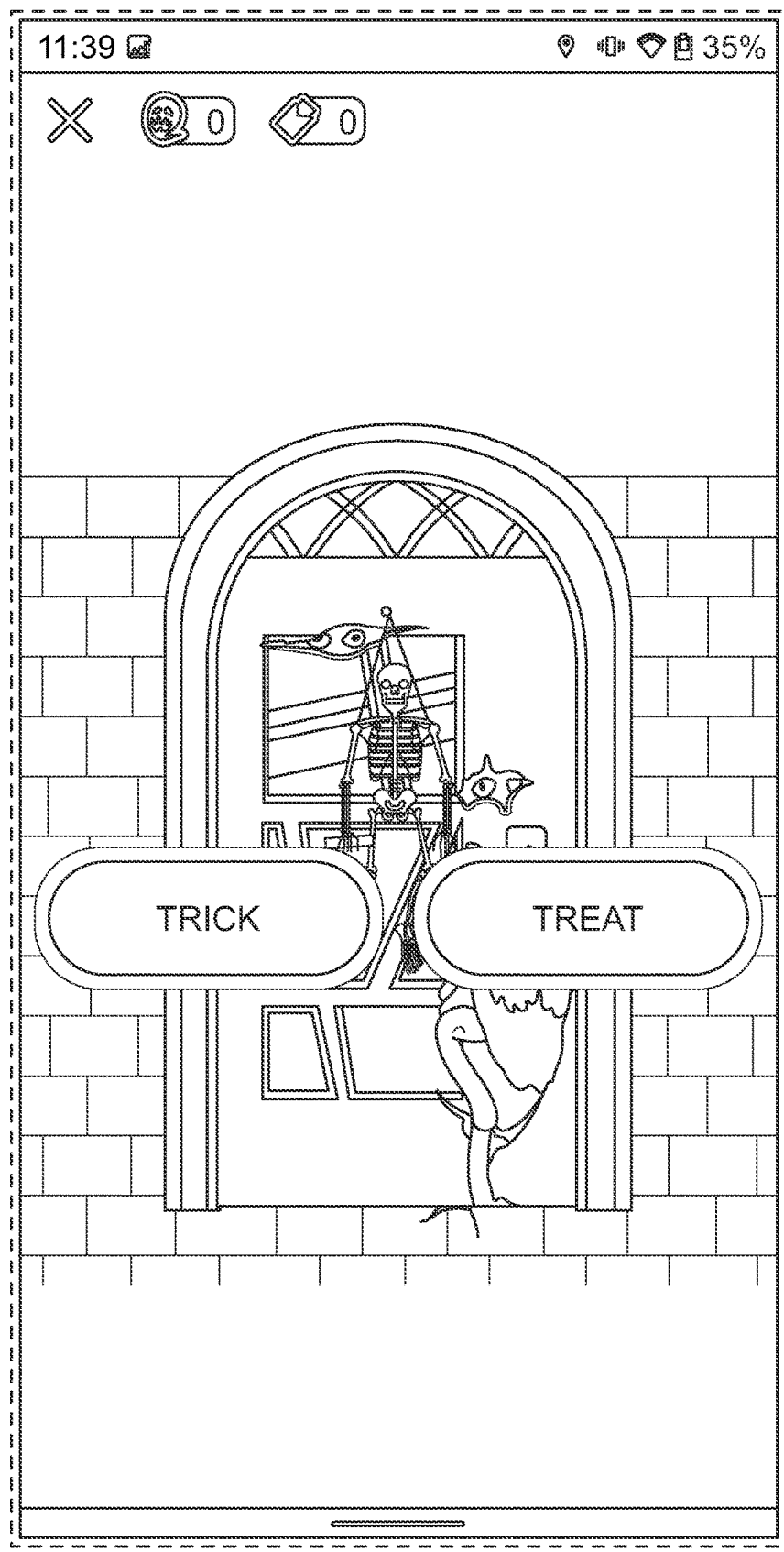
FIG. 6 illustrates an example GUI, according to certain non-limiting embodiments, on a client device facilitating a user interaction with a virtual doorway.

When a user or sub-user account interacts with a particular virtual doorway, the computing system can initiate an API call to facilitate an interaction with a virtual doorway. In some non-limiting embodiments, the user or sub-user can be presented with one or more options as part of the interaction. FIG. 6 illustrates an example GUI, according to certain non-limiting embodiments, on a client device facilitating a user interaction with a virtual doorway. For example, for a confectionery distribution network themed for Halloween, a user or sub-user can be provided an option for a "trick" or a "treat" when interacting with a virtual doorway. In some non-limiting embodiments, if the user or sub-user selects a "trick", the user or sub-user can be presented with a list of options for a virtual prank which can comprise, for example and not by way of limitation, one of or more of sounds (e.g., an airhorn), images (e.g., a siren), flashing lights, or haptic feedback being presented to both the user or sub-user account selecting the "trick" and the user account that registered the particular virtual doorway.

Alternatively, if a user or sub-user selects a "treat", other non-limiting embodiments provide for the user or sub-user to receive one or more confectionery credits from the user account that registered the particular virtual doorway. If a user or sub-user selects a "treat", the computing system can send an API call to determine which user account registered the particular virtual doorway and to determine a quantity of confectionery credits in that user account that are currently available for distribution on the confectionery distribution network. In other non-limiting embodiments this can require the computing system accessing one or more databases comprising information about the available confectionery credit and virtual doorways linked to a particular user account. When determining that the user account has sufficient confectionery credit for distribution, the computing system can verify the user or sub-user has permission to access the virtual doorway according to one or more accessibility settings described herein. If the user or sub-user account has sufficient permission, the computing system can initiate an API call to transfer confectionery credit from the user account associated with the virtual doorway to the account associated with the user or sub-user initiating the virtual doorway interaction according to one or more of the distribution settings as described herein. In some non-limiting embodiments, the computing system can subsequently update the confectionery credit values in both user accounts that participated in the virtual doorway interaction. In certain non-limiting embodiments, a user account can designate one or more confectionery credits received from an interaction with a virtual doorway for redistribution on the confectionery credit distribution network via their own virtual doorway. Alternatively, a user account can designate one or more confectionery credits received from an interaction with a virtual doorway as "protected" such that they cannot be redistributed once acquired.

Figure 7:
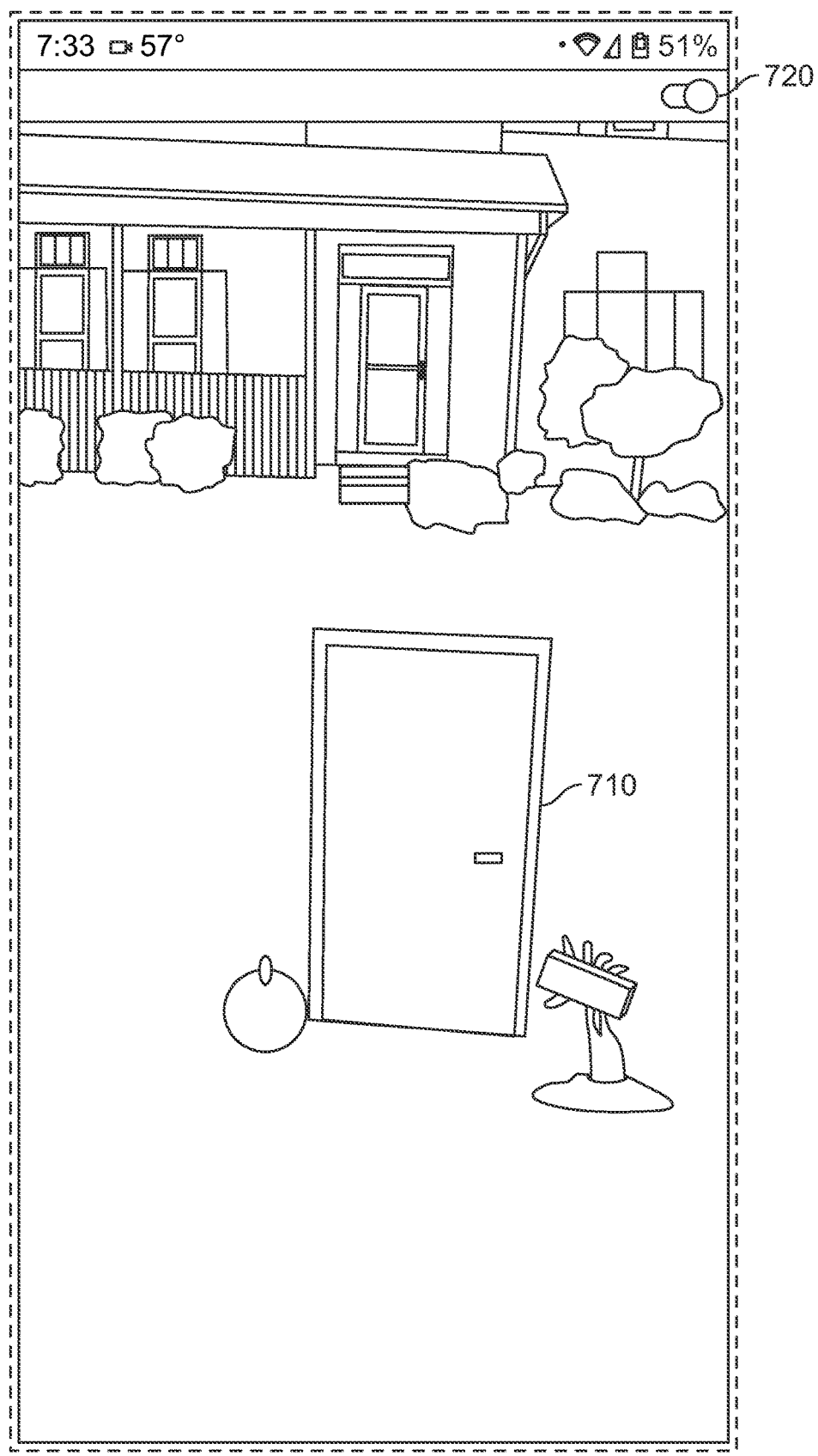
FIG. 7 illustrates an example GUI, according to certain non-limiting embodiments, on a client device facilitating a user interaction with a virtual doorway utilizing artificial reality.

In other non-limiting embodiments, augmented reality can be utilized by a client device operating in the distribution network. For example, FIG. 7 illustrates an example GUI, according to certain non-limiting embodiments, of a client device facilitating a user interaction with a virtual doorway utilizing artificial reality, also referred to as augmented reality. When the user selects a particular virtual doorway via the GUI, the computing system can access a current pose (e.g, position and/or orientation) of the client device. Based on the current pose, the computing system can access and display via the GUI one or more image data or video data of the user's location from a database. In certain non-limiting embodiments the image data or video data can be captured from the perspective of a virtual user that is walking or driving near the current location of the client device (i.e., a "street-level" or "curb-level" view from the current pose of the client device). In other non-limiting embodiments, when the user selects a particular virtual doorway via the GUI, the computing system can receive and display image data or video data captured from one or more cameras associated with the client device. The image data or video data, for example, can be concurrently received and displayed via the GUI during the duration of the interaction with the particular virtual doorway.

In certain non-limiting embodiments, the computing system can further generate and display an augmented reality overlay onto the displayed image data. An augmented reality game overlay can be generated based on an interaction with a particular virtual doorway. Based on the particular interaction selected (e.g., a particular virtual doorway) selected, the computing system can generate an augmented reality overlay corresponding to that particular virtual doorway. For example, the computing system can access one or more settings regarding the appearance of the particular virtual doorway (e.g., color, decorations, etc.) to generate one or more elements 710 of the augmented reality overlay. In some non-limiting embodiments, the computing system can send an augmented reality protocol to the client device to be stored on the client device. The augmented reality protocol can contain logic to apply the augmented reality overlay. As described above, the GUI can display a real-world image or video corresponding to a given physical address with a virtual image overlaid on top of the real-world image or video.

In some non-limiting embodiments, the user or sub-user account can select whether to turn on or off the augmented reality function. Turning the augmented reality function off can help to reduce the battery consumption of the client device, thereby allowing users to conserve the battery of the client device while interacting with the confectionery distribution network. When initiating an interaction, a given user can select between an artificial reality interaction or a non-artificial reality interaction via, for example, toggle 720. If the user chooses to turn off the augmented reality function, the remainder of the interaction with the virtual doorway can proceed without utilizing artificial reality.

Upon completing the interaction with a particular virtual doorway, the user or sub-user can return to the GUI as depicted in FIG. 1, where the user or sub-user can choose to initiate a subsequent interaction with another virtual doorway. In this matter the user or sub-user can interact with as many virtual doorways as desired subject to the accessibility and distribution settings described herein. In some non-limiting embodiments, upon completing an interaction the computing system can update the display of the GUI to reflect an updated visibility or accessibility of one or more virtual doorways. As an example, if a user or sub-user account interacts with a virtual doorway at 123 Main Street, and that particular doorway has an accessibility setting that permits a particular user to interact with it only once every 12 hours, when the user or sub-user completes the interaction and returns to the GUI map the virtual doorway icon at 123 Main Street can no longer be visible to that particular user or sub-user account for the proceeding 12 hours.

Figure 8:
FIG. 8 illustrates an example GUI, according to certain non-limiting embodiments, on a client device for redeeming confectionery credit.

In certain non-limiting embodiments, a user or sub-user account can redeem their collected confectionery credits with one or more redemption entities. FIG. 8 illustrates an example GUI, according to certain non-limiting embodiments, on a client device for redeeming confectionery credit. In certain non-limiting embodiments, the computing system can enlist an intermediary, for example a credit card company, to facilitate redemptions between the user, the confectionery distribution network, and one or more redemption entities. By transmitting information from the mobile application to the intermediary, the intermediary can use one or more payment systems to convert confectionery credit to real-world currency, which can then be utilized to purchase confectioneries according to the embodiments disclosed herein. In certain non-limiting embodiments, a computing system associated with the confectionery distribution network or a computing system associated with the third-party intermediary can query a database during the redemption process to validate that the quantity of confectionery credits available in a user's account. The query can include requesting whether sufficient amount of credits exist in a user account to obtain the redemption. In some non-limiting embodiments, the third-party intermediary can generate a unique payment method (e.g., a unique virtual credit card) for each redemption.

A user or sub-user can initiate a redemption at any time, or the distribution network can force all users to redeem their credits at a particular date or time. For example, for a confectionery distribution network themed for Halloween, the computing system can require all users and sub-user accounts to redeem their confectionery credits no later than November $1^{st}$ (the day after Halloween). In some non-limiting embodiments, a user or sub-user account must have a predetermined minimum amount of confectionery credit in order to initiate a redemption. Each confectionery credit can be assigned a cash value for purposes of redemption (e.g., 1 confectionery credit can be equal to $0.10 USD). This cash value can vary based on the method of redemption selected (e.g., if redeeming for an online purchase 1 confectionery credit can be equal to $0.10 USD, whereas if redeeming for a donation 1 confectionery credit can be equal to $0.20 USD).

Some non-limiting embodiments provide for one or more separate methods for redeeming confectionery credit. As a first example, the user or sub-user account can redeem confectionery credits to offset all or part of an online purchase of real confectioneries through an affiliated online retailer (e.g., a user can purchase a $5 bag of suckers by redeeming 50 confectionery credits). In certain non-limiting embodiments if a user or sub-user elects to redeem confectionery credits through an online retailer, the computing system can arrange for the purchased confectioneries to be shipped to the physical address associated with the user or sub-user account.

For example, in some non-limiting embodiments after selecting an online purchase redemption the computing system can transmit a message to an affiliated online retailer, for example a third-party or first-party server or website indicating the user is requesting to make an online confectionery purchase. The computing system can receive information about the price, inventory, and quantity of confectioneries available for purchase from the affiliated online retailer, and display a corresponding list of confectioneries, quantities, and corresponding prices to the user via the GUI. The corresponding prices can be displayed in confectionery credits, or in real currency (e.g., USD). When receiving a user selection of confectioneries and corresponding quantities, a request to complete the redemption can be initiated. The computing system can automatically populate one or more user information required to complete the redemption, for example and not by way of limitation, the name, email address, and physical address associated with the user. The computing system can further transmit the redemption information (e.g., selected type of confectionery, quantity, shipping address, etc.) to a website or server associated with the affiliated online retailer in order to facilitate the redemption. In certain other embodiments, parts of the redemption information can be transmitted from the computing system before the user selects the confectionery or corresponding quantity. For example, the shipping address can be, upon receiving the initial request, transmitted from the computing system to the affiliated online retailer. The affiliated online retailer can ship the appropriate confectioneries to the physical address associated with the user account. In some non-limiting embodiments, the computing system can further deduct the appropriate quantity of confectionery credit from the user account upon completion of the redemption.

As a second example, the user or sub-user account can redeem confectionery credits to receive a coupon or gift card valid for an in-store purchase of confectioneries through an affiliated retailer (e.g., a user can redeem 50 confectionery credits for a $5 coupon valid for confectionery purchases at their neighborhood supermarket). In some non-limiting embodiments if a user elects to redeem confectionery credits for a coupon or gift card, the computing system can arrange for the coupon or gift-card to be shipped to the physical address associated with the user or sub-user account, or the computing system can transmit a code or coupon to a telephone number or email associated with the user or sub-user account, which can then be printed and presented at a participating retail location.

In some non-limiting embodiments after selecting an in-store purchase redemption the computing system can transmit a message to an affiliated retailer, for example a third-party or first-party server or website indicating the user is requesting to make an in-store confectionery purchase. In some non-limiting embodiments, the user can select a particular affiliated retailer from a list of retailers via the GUI. In some non-limiting embodiments, the computing system can transmit a notification, such as an email or push notification, to the first user with a link to access a redemption webpage. In certain non-limiting embodiments, the computing system can receive information from a server or website regarding the conversion rate from confectionery credit to real currency (e.g., USD) for the selected affiliated retailer. In some non-limiting embodiments, the user can select, via the GUI, the quantity of confectionery credit to redeem for an in-store purchase. When receiving this quantity, the computing system can automatically populate one or more user information required to complete the redemption, for example and not by way of limitation, the name, email address, and physical address associated with the user. The computing system can further convert the quantity of confectionery credit into a real-world credit via the conversion rate, and transmit the redemption information to a website or server associated with the selected affiliated retailer in order to facilitate the in-store purchase redemption. The selected affiliated retailer can complete the redemption by transmitting, for example, a corresponding gift card, scannable barcode, or coupon code to the user via, for example, a physical mailing, an email message, or a text message. In some non-limiting embodiments, the computing system can further deduct the appropriate quantity of confectionery credit from the user account upon completion of the in-store redemption.

As a third example, the user or sub-user account can redeem confectionery credits to donate to a participating non-profit organization (e.g., a user can redeem 50 confectionery credits to make a $10 donation to a non-profit organization). In some non-limiting embodiments if a user elects to redeem confectionery credits for a donation, the computing system can facilitate the donation through the GUI of the confectionery distribution network. The computing system can further arrange for a receipt to be mailed to the physical address associated with the user or sub-user account, or the computing system can transmit a receipt to a telephone number or email associated with the user or sub-user account, which can then be utilized for recordation and tax credit purposes.

For example, in some non-limiting embodiments after selecting a donation redemption the computing system can transmit a message to a participating non-profit organization indicating the user is requesting to make a donation redemption. In some non-limiting embodiments, the user can select a particular non-profit organization from a list of non-profit organizations via the GUI. In certain non-limiting embodiments, the computing system can receive information from a server or website regarding the conversion rate from confectionery credit to donation credit (e.g., USD) for the selected non-profit organization. In some non-limiting embodiments, the user can select, via the GUI, the quantity of confectionery credit to redeem for a donation redemption. Upon receiving this quantity, the computing system can automatically populate one or more user information required to complete the redemption, for example and not by way of limitation, the name, email address, and physical address associated with the user. The computing system can further convert the quantity of confectionery credit into a donation credit via the conversion rate and transmit the redemption information to a website or server associated with the selected non-profit organization in order to facilitate the donation redemption. The selected non-profit organization can complete the donation by processing the request, and transmitting, for example, a corresponding receipt or record to the user via, for example, a physical mailing, an email message, or a text message. In some non-limiting embodiments, the computing system can further deduct the appropriate quantity of confectionery credit from the user account upon completion of the donation redemption.

Figure 9:
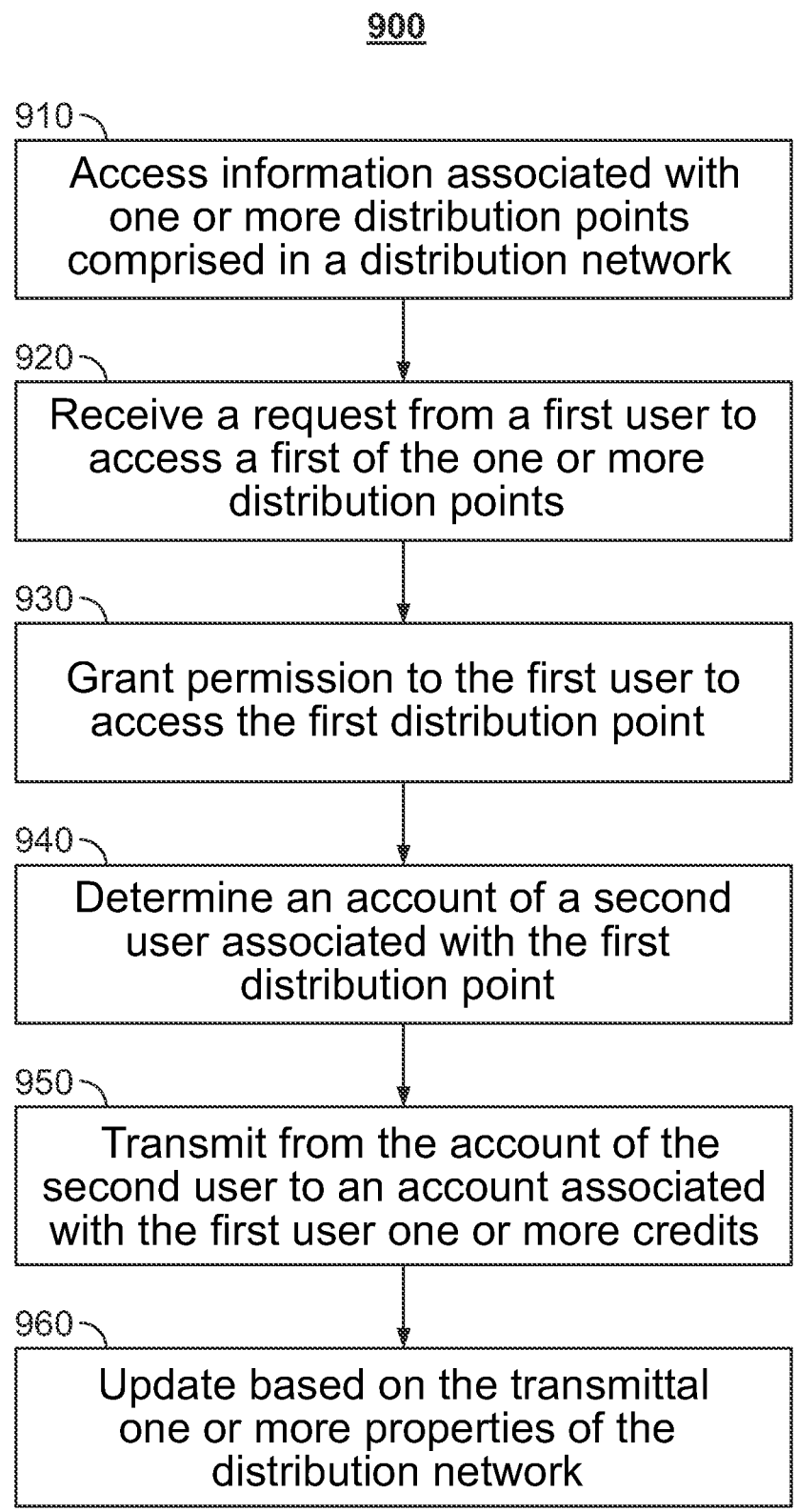
FIG. 9 illustrates an example or process method, according to certain non-limiting embodiments, for facilitating access and distribution of confectionery credits.

FIG. 9 illustrates an example method 900, according to certain non-limiting embodiments, for facilitating access and distribution of confectionery credits. The method can begin at step 910, where a computing system accesses information associated with one or more distribution points comprised in a distribution network. In certain non-limiting embodiments these distribution points can comprise, for example, one or more virtual doorways displayed as icons on a map via a GUI on a client device. In certain non-limiting embodiments the default view of the map can correspond to a current location of the computing device displaying the GUI (e.g., the map can by default be centered on the current location of the mobile device that has accessed the mobile application). In certain non-limiting embodiments one or more accessibility settings or distribution settings associated with one or more virtual doorways can determine whether or not a particular virtual doorway is visible to one or more users on the map interface.

At step 920, the computing system can receive a request from a first user to access a first of the one or more distribution points. If multiple users request to interact with a particular virtual doorway, the computing system can place the users or sub-users into a virtual queue based on the time their request is initiated.

At step 930, the computing system can grant permission to the first user to access the first distribution point. In certain non-limiting embodiments, the computing system can make this determination based on one or more accessibility settings or distribution settings associated with the first virtual doorway. These accessibility settings and distribution settings can be adjusted by a user account that is linked to the first virtual doorway, or these settings can be adjusted automatically by the computing system.

At step 940, the computing system can determine an account of a second user associated with the first distribution point. The second user account can include a current amount of credit. In certain non-limiting embodiments this can require the computing system to access one or more databases comprising information about the available credit and distribution points linked to a particular user account. In certain non-limiting embodiments, the computing system can further determine that the second user account associated with the first virtual doorway has sufficient confectionery credit for distribution of credit to the first user.

At step 950, the computing system can transmit from the account of the second user to an account associated with the first user one or more credits. In certain non-limiting embodiments, the credits can be confectionery credits. The amount of credit transferred can be determined based on the accessibility or distribution settings associated with the first virtual doorway. At step 960, the computing system can update based on the transmittal one or more properties of the distribution network. In certain non-limiting embodiments, one or more of these updated properties can be directed to a GUI that displays one or more icons representing one or more distribution points. In certain non-limiting embodiments one or more of these updated properties to the GUI can be based on one or more accessibility settings or distribution settings associated with one or more virtual doorways. In other non-limiting embodiments one or more of these updated properties can comprise transmitting information associated with the first and second user accounts to one or more databases, for example the quantity of credit in the first and second user accounts. The one or more updated properties can also include sending information to the confectionery distribution network to indicate that a transmittal has been processed between the first user and the second user.

Certain non-limiting embodiments can repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for facilitating access and distribution of confectionery credits including the particular steps of the method of FIG. 9, this disclosure contemplates any suitable method for facilitating access and distribution of confectionery credits including any suitable steps, which can include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Certain non-limiting embodiments provide a method or process for redeeming confectionery credits collected through the confectionery distribution network. For example, a computing device accesses redemption information associated with one or more redemption entities, for example an online retailer, an in-store retailer, or a non-profit organization. The computing system can receive information about the price, inventory, and quantity of confectioneries available for purchase from a redemption entity, and display a corresponding list of confectioneries, quantities, and corresponding prices to the user via the GUI. The corresponding prices can be displayed in confectionery credits, or in real currency (e.g., USD).

The computing system can receive a redemption request from a first user to redeem one or more credits in an account associated with a first user. The request can be facilitated, for example, via a GUI on a client device of the first user. In some non-limiting embodiments, the user can select a particular affiliated retailer from a list of retailers via the GUI. The user can select, via the GUI, the quantity of confectionery credit to be redeemed in a given redemption transaction from one or more redemption entities.

In certain non-limiting embodiments, the computing system can transmit the redemption request and information associated with the first user account to a first redemption entity. The computing system can transmit, for example, the selected type of confectionery, quantity, shipping address, user information, or any other relevant information, to a website or server associated with the redemption entity in order to facilitate the redemption. In certain other embodiments, parts of the redemption information can be transmitted from the computing system before the user selects the confectionery or corresponding credit quantity. The computing system, for example, can further deduct the appropriate quantity of confectionery credit from the user account upon completing the redemption.

In some non-limiting embodiments, one or more steps of the method or process of redeeming confectionery credits collected through the confectionery distribution network can be repeated. Although this disclosure describes particular steps of the method of redeeming confectionery credits collected through the confectionery distribution network as occurring in a particular order, this disclosure contemplates any suitable steps of the method of redeeming confectionery credits collected through the confectionery distribution network occurring in any suitable order. Moreover, although this disclosure describes an example method for redeeming confectionery credits collected through the confectionery distribution network, this disclosure contemplates any suitable method for redeeming confectionery credits collected through the confectionery distribution network including any suitable steps, which can include all, some, or none of the steps of the method, where appropriate. Furthermore, although this disclosure describes and illustrates particular components, devices, or systems carrying out particular steps of the method of redeeming confectionery credits collected through the confectionery distribution network, this disclosure contemplates any suitable combination of any suitable components, devices, or systems carrying out any suitable steps of the method of redeeming confectionery credits collected through the confectionery distribution network.

Figure 10:
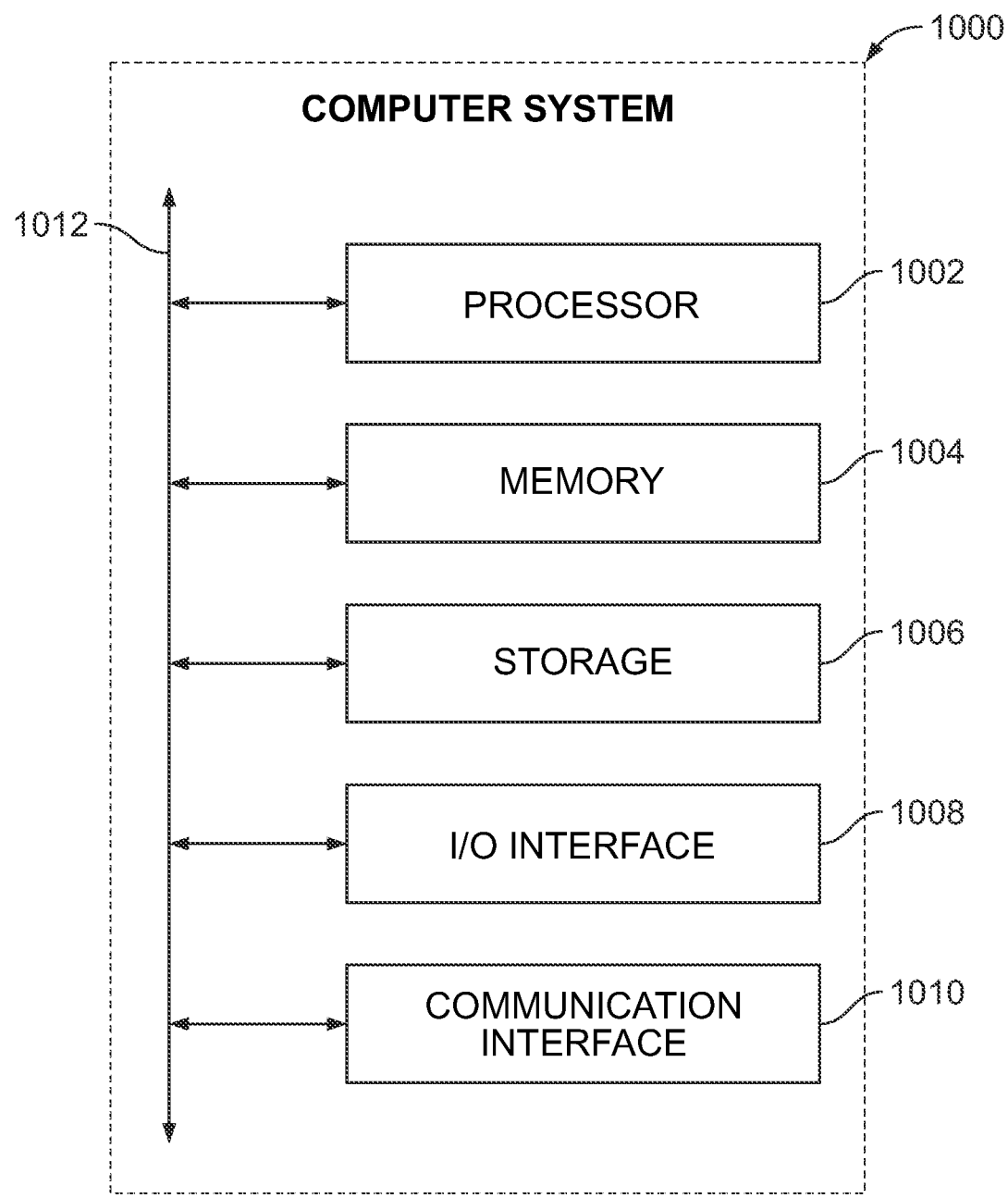
FIG. 10 illustrates an example computer system according to certain non-limiting embodiments.

FIG. 10 illustrates an example computer system 1000 used to access or interact with the confectionery distribution network. In certain non-limiting embodiments, one or more computer systems 1000 perform one or more steps of one or more methods described or illustrated herein. In certain non-limiting embodiments, one or more computer systems 1000 provide functionality described or illustrated herein. In certain non-limiting embodiments, software running on one or more computer systems 1000 performs one or more steps of one or more methods described or illustrated herein or provides functionality described or illustrated herein. Certain non-limiting embodiments include one or more portions of one or more computer systems 1000. Herein, reference to a computer system can encompass a computing device, and vice versa, where appropriate. Moreover, reference to a computer system can encompass one or more computer systems, where appropriate.

This disclosure contemplates any suitable number of computer systems 1000. This disclosure contemplates computer system 1000 taking any suitable physical form. As example and not by way of limitation, computer system 1000 can be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1000 can include one or more computer systems 1000; be unitary or distributed; span multiple locations; span multiple machines; span multiple data centers; or reside in a cloud, which can include one or more cloud components in one or more networks. Where appropriate, one or more computer systems 1000 can perform without substantial spatial or temporal limitation one or more steps of one or more methods described or illustrated herein. As an example, and not by way of limitation, one or more computer systems 1000 can perform in real time or in batch mode one or more steps of one or more methods described or illustrated herein. One or more computer systems 1000 can perform at different times or at different locations one or more steps of one or more methods described or illustrated herein, where appropriate.

In certain non-limiting embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In certain non-limiting embodiments, processor 1002 includes hardware for executing instructions, such as those making up a computer program. As an example and not by way of limitation, to execute instructions, processor 1002 can retrieve (or fetch) the instructions from an internal register, an internal cache, memory 1004, or storage 1006; decode and execute them; and then write one or more results to an internal register, an internal cache, memory 1004, or storage 1006. In certain non-limiting embodiments, processor 1002 can include one or more internal caches for data, instructions, or addresses. This disclosure contemplates processor 1002 including any suitable number of any suitable internal caches, where appropriate. As an example, and not by way of limitation, processor 1002 can include one or more instruction caches, one or more data caches, and one or more translation lookaside buffers (TLBs). Instructions in the instruction caches can be copies of instructions in memory 1004 or storage 1006, and the instruction caches can speed up retrieval of those instructions by processor 1002. Data in the data caches can be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches can speed up read or write operations by processor 1002. The TLBs can speed up virtual-address translation for processor 1002. In certain non-limiting embodiments, processor 1002 can include one or more internal registers for data, instructions, or addresses. This disclosure contemplates processor 1002 including any suitable number of any suitable internal registers, where appropriate. Where appropriate, processor 1002 can include one or more arithmetic logic units (ALUs); be a multi-core processor; or include one or more processors 1002. Although this disclosure describes and illustrates a particular processor, this disclosure contemplates any suitable processor.

In certain non-limiting embodiments, memory 1004 includes main memory for storing instructions for processor 1002 to execute or data for processor 1002 to operate on. As an example, and not by way of limitation, computer system 1000 can load instructions from storage 1006 or another source (such as, for example, another computer system 1000) to memory 1004. Processor 1002 can then load the instructions from memory 1004 to an internal register or internal cache. To execute the instructions, processor 1002 can retrieve the instructions from the internal register or internal cache and decode them. During or after execution of the instructions, processor 1002 can write one or more results (which can be intermediate or final results) to the internal register or internal cache. Processor 1002 can then write one or more of those results to memory 1004. In certain non-limiting embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which can each include an address bus and a data bus) can couple processor 1002 to memory 1004. Bus 1012 can include one or more memory buses, as described below. In certain non-limiting embodiments, one or more memory management units (MMUs) reside between processor 1002 and memory 1004 and facilitate accesses to memory 1004 requested by processor 1002. In certain non-limiting embodiments, memory 1004 includes random access memory (RAM). This RAM can be volatile memory, where appropriate. Where appropriate, this RAM can be dynamic RAM (DRAM) or static RAM (SRAM). Moreover, where appropriate, this RAM can be single-ported or multi-ported RAM. This disclosure contemplates any suitable RAM. Memory 1004 can include one or more memories 1004, where appropriate. Although this disclosure describes and illustrates a particular memory component, this disclosure contemplates any suitable memory.

In certain non-limiting embodiments, storage 1006 includes mass storage for data or instructions. As an example and not by way of limitation, storage 1006 can include a hard disk drive (HDD), a floppy disk drive, flash memory, an optical disc, a magneto-optical disc, magnetic tape, or a Universal Serial Bus (USB) drive or a combination of two or more of these. Storage 1006 can include removable or non-removable (or fixed) media, where appropriate. Storage 1006 can be internal or external to computer system 1000, where appropriate. In certain non-limiting embodiments, storage 1006 is non-volatile, solid-state memory. In certain non-limiting embodiments, storage 1006 includes read-only memory (ROM). Where appropriate, this ROM can be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 can include one or more storage control units facilitating communication between processor 1002 and storage 1006, where appropriate. Where appropriate, storage 1006 can include one or more storages 1006. Although this disclosure describes and illustrates particular storage, this disclosure contemplates any suitable storage.

In certain non-limiting embodiments, I/O interface 1008 includes hardware, software, or both, providing one or more interfaces for communication between computer system 1000 and one or more I/O devices. Computer system 1000 can include one or more of these I/O devices, where appropriate. One or more of these I/O devices can enable communication between a person and computer system 1000. As an example and not by way of limitation, an I/O device can include a keyboard, keypad, microphone, monitor, mouse, printer, scanner, speaker, still camera, stylus, tablet, touch screen, trackball, video camera, another suitable I/O device or a combination of two or more of these. An I/O device can include one or more sensors. This disclosure contemplates any suitable I/O devices and any suitable I/O interfaces 1008 for them. Where appropriate, I/O interface 1008 can include one or more device or software drivers enabling processor 1002 to drive one or more of these I/O devices. I/O interface 1008 can include one or more I/O interfaces 1008, where appropriate. Although this disclosure describes and illustrates a particular I/O interface, this disclosure contemplates any suitable I/O interface.

In certain non-limiting embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 can include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 can communicate with an ad hoc network, a personal area network (PAN), a local area network (LAN), a wide area network (WAN), a metropolitan area network (MAN), or one or more portions of the Internet or a combination of two or more of these. One or more portions of one or more of these networks can be wired or wireless. As an example, computer system 1000 can communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 can include any suitable communication interface 1010 for any of these networks, where appropriate. Communication interface 1010 can include one or more communication interfaces 1010, where appropriate. Although this disclosure describes and illustrates a particular communication interface, this disclosure contemplates any suitable communication interface.

In certain non-limiting embodiments, bus 1012 includes hardware, software, or both coupling components of computer system 1000 to each other. As an example and not by way of limitation, bus 1012 can include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 can include one or more buses 1012, where appropriate. Although this disclosure describes and illustrates a particular bus, this disclosure contemplates any suitable bus or interconnect.

Herein, a computer-readable non-transitory storage medium or media can include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium can be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments can include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates certain non-limiting embodiments as providing particular advantages, certain non-limiting embodiments can provide none, some, or all of these advantages.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications can be made to the elements and operations described above to obtain a result that remains within the scope of the systems and processes described in this disclosure.

What is claimed is:

1. A method comprising, by a computing device:
obtaining a current location of a first client device;
generating, for the first client device, a graphical user interface (GUI) comprising a perspective map interface centered on the current location of the first client device and a counter of confectionary credits;
accessing a database that comprises a list of virtual doorways and corresponding physical addresses, and determining a subset of virtual doorways of the list of virtual doorways that can be visible on the GUI based on the current location of the first client device and settings associated with each of one or more distribution points comprised in a confectionery distribution network, wherein the one or more distribution points are represented by the subset of virtual doorways on the GUI;
sending, to the first client device, instructions for visualizing the subset of virtual doorways on the GUI of the first client device;
when multiple virtual doorways of the subset of virtual doorways are located at a same physical address, generating a single virtual doorway icon in the GUI that indicates a number of the multiple virtual doorways located at a particular location in the GUI corresponding to the same physical address;
registering a first account with the computing device via a mobile application executed on the first client device, linking a particular virtual doorway of the subset of virtual doorways to the first account, obtaining location sensor data from a Global Positioning System (GPS) receiver of the first client device, automatically determining a physical address of the first client device, and linking the physical address to the particular virtual doorway;
receiving, via an interaction by the first client device with a first virtual doorway of the subset of virtual doorways on the GUI, a request from the first client device to access a first distribution point of the one or more distribution points, wherein the first distribution point is represented by the first virtual doorway;
granting permission to the first client device to access the first distribution point;
sending an Application Programming Interface (API) call from the first client device to the computing device to determine in real-time a second account associated with the first distribution point and a quantity of confectionary credits in the second account that are currently available for distribution;
transmitting, from the second account to the first account, one or more confectionary credits from among the quantity of confectionary credits in the second account;
updating, based on the transmitting, one or more properties of the confectionery distribution network; and
updating the GUI for the first client device, wherein the updating comprises updating visibility of the subset of virtual doorways based on settings associated with each virtual doorway of the subset of virtual doorways and updating the counter of confectionary credits to include the one or more confectionary credits that were transmitted.

2. The method of claim 1, further comprising:
accessing redemption information associated with one or more redemption entities;
displaying the redemption information on the GUI of the first client device;
receiving a redemption request from the first client device to redeem the one or more confectionary credits in the first account with a first redemption entity of the one or more redemption entities; and
transmitting the redemption request and the redemption information associated with the first account to the first redemption entity.

3. The method of claim 1, further comprising:
accessing one or more images comprising a perspective of a location of the first distribution point;
generating an augmented reality overlay, wherein the augmented reality overlay represents the first distribution point in an artificial reality environment; and
sending, to the first client device, instructions for displaying on the GUI the one or more images and the augmented reality overlay.

4. The method of claim 3, wherein the accessing of the one or more images comprising the perspective of the location of the first distribution point further comprises:
determining a current pose of the first client device; and
accessing one or more image data or video data associated with the current location of the first client device corresponding to the current pose of the first client device from the database.

5. The method of claim 4, wherein the accessing of the one or more images comprising the perspective of the location of the first distribution point further comprises:
receiving image data or video data captured from one or more cameras connected to the first client device.

6. The method of claim 1, wherein the settings associated with each of the one or more distribution points comprise one or more accessibility settings or distribution settings, and wherein granting permission to access the first distribution point is based on the one or more accessibility settings or distribution settings associated with the first distribution point.

7. The method of claim 1, wherein the settings associated with the first distribution point comprise one or more of:
a designation that one or more client devices than can access the first distribution point based on inclusion on an access list;
a designation that one or more client devices can access the first distribution point during a specified time period; or
a designation that one or more client devices can access the first distribution point based on a determination that the first client device of the first user is within a threshold distance from a physical location associated with the first distribution point.

8. The method of claim 1, wherein the settings associated with the first distribution point comprise one or more of:
a limitation on a quantity of confectionary credits that can be transmitted to one or more accounts; or
a limitation on a quantity of confectionary credits that can be transmitted to one or more accounts over a predetermined time period.

9. The method of claim 1, wherein updating the one or more properties of the confectionery distribution network comprises one or more of:
transmitting, to a server affiliated with a database of user accounts, information comprising an amount of confectionary credits in at least the first account or the second account;
transmitting, to a server affiliated with a map application programming interface (API), a current location of at least one of the first client device or a second client device associated with the first distribution point; or
sending information to the confectionery distribution network to indicate that a transmittal has been processed between the first account and the second account.

10. A computer-readable non-transitory storage medium embodying software that is operable when executed to:
obtain a current location of a first client device;
generate, for the first client device, a graphical user interface (GUI) comprising a perspective map interface centered on the current location of the first client device and a counter of confectionary credits;
access a database that comprises a list of virtual doorways and corresponding physical addresses, and determining a subset of virtual doorways of the list of virtual doorways that can be visible on the GUI based on the current location of the first client device and settings associated with each of one or more distribution points comprised in a confectionery distribution network, wherein the one or more distribution points are represented by the subset of virtual doorways on the GUI;
send, to the first client device, instructions for visualizing the subset of virtual doorways on the GUI of the first client device;
when multiple virtual doorways of the subset of virtual doorways are located at a same physical address, generate a single virtual doorway icon in the GUI that indicates a number of the multiple virtual doorways located at a particular location in the GUI corresponding to the same physical address;
register a first account with the computing device via a mobile application executed on the first client device, link a particular virtual doorway of the subset of virtual doorways to the first account, obtain location sensor data from a Global Positioning System (GPS) receiver of the first client device, automatically determine a physical address of the first client device, and link the physical address to the particular virtual doorway;
receive, via an interaction by the first client device with a first virtual doorway of the subset of virtual doorways on the GUI, a request from the first client device to access a first distribution point of the one or more distribution points, wherein the first distribution point is represented by the first virtual doorway;
grant permission to the first client device to access the first distribution point;
send an Application Programming Interface (API) call from the first client device to the computing device to determine in real-time a second account associated with the first distribution point and a quantity of confectionary credits in the second account that are currently available for distribution;
transmit, from the second account to the first account, one or more confectionary credits from among the quantity of confectionery credits in the second account;
update, based on the transmitting, one or more properties of the confectionery distribution network; and
update the GUI for the first client device, wherein the updating comprises updating visibility of the subset of virtual doorways based on settings associated with each virtual doorway of the subset of virtual doorways and updating the counter of confectionary credits to include the one or more confectionary credits that were transmitted.

11. The computer-readable non-transitory storage medium of claim 10, wherein the software is further operable when executed to:
access redemption information associated with one or more redemption entities;
display the redemption information on the GUI of the first client device;
receive a redemption request from the first client device to redeem the one or more confectionary credits in the first account with a first redemption entity of the one or more redemption entities; and
transmit the redemption request and the redemption information associated with the first account to the first redemption entity.

12. The computer-readable non-transitory storage medium of claim 10, wherein the software is further operable when executed to:
access one or more images comprising a perspective of a location of the first distribution point;
generate an augmented reality overlay, wherein the augmented reality overlay represents
the first distribution point in an artificial reality environment; and
send, to the first client device, instructions for displaying on the GUI he one or more images and the augmented reality overlay.

13. The computer-readable non-transitory storage medium of claim 12, wherein the accessing of the one or more images comprising the perspective of the location of the first distribution point further comprises:
  determining a current pose of the first client device; and
  accessing one or more image data or video data associated with the current location of the first client device corresponding to the current pose of the first client device from the database.

14. The computer-readable non-transitory storage medium of claim 13, wherein the accessing of the one or more images comprising the perspective of the location of the first distribution point further comprises:
  receiving image data or video data captured from one or more cameras associated with the first client device.

15. The computer-readable non-transitory storage medium of claim 10, wherein the settings associated with each of the one or more distribution points comprise one or more accessibility settings or distribution settings, and wherein granting permission to access the first distribution point is based on the one or more accessibility settings or distribution settings associated with the first distribution point.

16. The computer-readable non-transitory storage medium of claim 10, wherein the settings associated with the first distribution point comprise one or more of:
  a designation that one or more client devices than can access the first distribution point based on inclusion on an access list;
  a designation that one or more client devices can access the first distribution point during a specified time period; or
  a designation that one or more client devices can access the first distribution point based on a determination that the first client device is within a threshold distance from a physical location associated with the first distribution point.

17. The computer-readable non-transitory storage medium of claim 10, wherein the settings associated with the first distribution point comprise one or more of: a limitation on a quantity of confectionary credits that can be transmitted to one or more accounts; or
  a limitation on a quantity of confectionary credits that can be transmitted to one or more accounts over a predetermined time period.

18. The computer-readable non-transitory storage medium of claim 10, wherein updating one or more properties of the confectionery distribution network comprises one or more of:
  transmitting, to a server affiliated with a database of user accounts, information comprising an amount of confectionary credits in at least the first account or the second account;
  transmitting, to a server affiliated with a map application programming interface (API), a current location of at least one of the first client device or a second client device associated with the first distribution point; or
  sending information to the confectionery distribution network to indicate that a transmittal has been processed between the first account and the second account.

19. A computing system comprising:
  one or more processors; and
  one or more computer-readable non-transitory storage media coupled to the one or more of the processors and comprising instructions operable when executed by the one or more of the processors to cause the system to:
  obtain a current location of a first client device;
  generate, for the first client device, a graphical user interface (GUI) comprising a perspective map interface centered on the current location of the first client device and a counter of confectionary credits;
  access a database that comprises a list of virtual doorways and corresponding physical addresses, and determining a subset of virtual doorways of the list of virtual doorways that can be visible on the GUI based on the current location of the first client device and settings associated with each of one or more distribution points comprised in a confectionery distribution network, wherein the one or more distribution points are represented by the subset of virtual doorways on the GUI;
  send, to the first client device, instructions for visualizing the subset of virtual doorways on the GUI of the first client device;
  when multiple virtual doorways of the subset of virtual doorways are located at a same physical address, generate a single virtual doorway icon in the GUI that indicates a number of the multiple virtual doorways located at a particular location in the GUI corresponding to the same physical address;
  register a first account with the computing device via a mobile application executed on the first client device, link a particular virtual doorway of the subset of virtual doorways to the first account, obtain location sensor data from a Global Positioning System (GPS) receiver of the first client device, automatically determine a physical address of the first client device, and link the physical address to the particular virtual doorway;
  receive, via an interaction by the first client device with a first virtual doorway of the subset of virtual doorways on the GUI, a request from the first client device to access a first distribution point of the one or more distribution points, wherein the first distribution point is represented by the first virtual doorway;
  grant permission to the first client device to access the first distribution point;
  send an Application Programming Interface (API) call from the first client device to the computing device to determine in real-time a second account associated with the first distribution point and a quantity of confectionary credits in the second account that are currently available for distribution;
  transmit, from the second account to the first account, one or more confectionary credits from among the quantity of confectionary credits in the second account;
  update, based on the transmitting, one or more properties of the confectionery distribution network; and
  update the GUI for the first client device, wherein the updating comprises updating visibility of the subset of virtual doorways based on settings associated with each virtual doorway of the subset of virtual doorways and updating the counter of confectionary credits to include the one or more confectionary credits that were transmitted.

20. The system of claim 19, wherein the instructions are further operable when executed to:
  access redemption information associated with one or more redemption entities; display the redemption information on the GUI of the first client device;
  receive a redemption request from the first client device to redeem the one or more confectionary credits in the first account with a first redemption entity of the one or more redemption entities; and
  transmit the redemption request and the redemption information associated with the first account to the first redemption entity.

21. The system of claim 19, wherein the instructions are further operable when executed to:
- access one or more images comprising a perspective of a location of the first distribution point;
- generate an augmented reality overlay, wherein the augmented reality overlay represents the first distribution point in an artificial reality environment; and
- send, to the first client device, instructions for displaying on the GUI the one or more images and the augmented reality overlay.

22. The system of claim 21, wherein the accessing of the one or more images comprising the perspective of the location of the first distribution point further comprises:
- determining a current pose of the first client device; and
- accessing one or more image data or video data associated with the current location of the first client device corresponding to the current pose of the first client device from the database.

23. The system of claim 22, wherein the accessing of the one or more images comprising the perspective of the first distribution point further comprises:
- receiving image data or video data captured from one or more cameras associated with the first client device.

24. The system of claim 19, wherein the settings associated with each of the one or more distribution points comprise one or more accessibility settings or distribution settings, and wherein granting permission to access the first distribution point is based on the one or more accessibility settings or distribution settings associated with the first distribution point.

25. The system of claim 19, wherein the settings associated with the first distribution point comprise one or more of:
- a designation that one or more client devices than can access the first distribution point based on inclusion on an access list;
- a designation that one or more client devices can access the first distribution point during a specified time period; or
- a designation that one or more client devices can access the first distribution point based on a determination that the first client device is within a threshold distance from a physical location associated with the first distribution point.

26. The system of claim 19, wherein the settings associated with the first distribution point comprise one or more of:
- a limitation on a quantity of confectionary credits that can be transmitted to one or more accounts; or
- a limitation on a quantity of confectionary credits that can be transmitted to one or more accounts over a predetermined time period.

27. The system of claim 19, wherein updating one or more properties of the confectionery distribution network comprises one or more of:
- transmitting, to a server affiliated with a database of user accounts, information comprising an amount of confectionary credits in at least the first account or the second account;
- transmitting, to a server affiliated with a map application programming interface (API), a current location of at least one of the first client device or a second client device associated with the first distribution point; or
- sending information to the confectionery distribution network to indicate that a transmittal has been processed between the first account and the second account.

* * * * *